United States Patent
Agrawal et al.

(10) Patent No.: US 12,248,771 B2
(45) Date of Patent: Mar. 11, 2025

(54) LEARNING-AUGMENTED APPLICATION DEPLOYMENT PIPELINE

(71) Applicant: Capital One Services, LLC, McLean, VA (US)

(72) Inventors: Roli Agrawal, Centreville, VA (US); Bada Kim, McLean, VA (US); Varun Nalamati, Cumming, GA (US); Laxmi Kadariya, Chantilly, VA (US); Patrick Tirtapraja, Arlington, VA (US); Nicholas Sorkin, Vienna, VA (US); Frank Huang, McLean, VA (US); Taylor Gaskins, San Francisco, CA (US); Hasan Alatrakchi, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 474 days.

(21) Appl. No.: 17/739,707

(22) Filed: May 9, 2022

(65) Prior Publication Data

US 2023/0359449 A1 Nov. 9, 2023

(51) Int. Cl.
*G06F 8/60* (2018.01)
*G06F 11/30* (2006.01)
*G06F 11/32* (2006.01)
*G06N 3/045* (2023.01)

(52) U.S. Cl.
CPC ............ *G06F 8/60* (2013.01); *G06F 11/3051* (2013.01); *G06F 11/327* (2013.01); *G06N 3/045* (2023.01)

(58) Field of Classification Search
USPC ......................................................... 717/174
See application file for complete search history.

(56) References Cited

U.S. PATENT DOCUMENTS

| | | | |
|---|---|---|---|
| 10,726,356 B1* | 7/2020 | Zarandioon | G06N 20/00 |
| 11,029,673 B2* | 6/2021 | Honda | G05B 13/0265 |
| 11,900,231 B2* | 2/2024 | Liu | G06N 5/01 |
| 2009/0210360 A1* | 8/2009 | Sankar | G06F 9/44505 |
| | | | 706/47 |
| 2021/0034960 A1* | 2/2021 | Khapali | G06N 3/08 |
| 2021/0073627 A1* | 3/2021 | Sarferaz | G06N 3/08 |
| 2021/0224053 A1* | 7/2021 | Tiwari | G06N 20/00 |
| 2022/0215285 A1* | 7/2022 | Daly | G06N 5/027 |
| 2022/0414401 A1* | 12/2022 | Saillet | G06F 18/214 |
| 2023/0281482 A1* | 9/2023 | Lantzman | G06N 5/025 |
| | | | 706/12 |

* cited by examiner

*Primary Examiner* — Qing Chen
*Assistant Examiner* — Clint Thatcher
(74) *Attorney, Agent, or Firm* — Foley & Lardner LLP (57) ABSTRACT

A method includes providing a neural network with metrics obtained from an execution of an application in a test environment to determine rule-related weights, scaling rule results with the rule-related weights to determine scaled rule results. The method also includes re-training the neural network with the rule results of the application, an indication that the executed application is selected for deployment in the production environment, and rule results of other applications in the test environment in response to a determination that the scaled rule results fail a threshold but that the application is selected for deployment in a production environment. The method also includes providing the re-trained neural network with the rule results to generate updated rule-related weights and scaling the rule results by the updated rule-related weights to determine updated scaled rule results.

20 Claims, 4 Drawing Sheets

LEARNING-AUGMENTED APPLICATION DEPLOYMENT PIPELINE

BACKGROUND

The appropriate management of applications in application deployment pipelines is critical for software development processes. When using a software deployment pipeline, a developer is often tasked with developing their software in a development environment. Relative to other environments, a development environment may include less data, prototyping tools, and fewer security concerns. While convenient for development, such an environment is unsuitable for stress-testing the application under more realistic constraints. A developer or other user may then migrate the developed application into a test environment, where the test environment may include tools to measure application performance metrics and data that is more suitable to simulate daily use. In many cases, the test environment will have access to test data, application performance rules, and other testing resources that reduce the risk of unready applications being deployed to a production environment.

SUMMARY

Developers, testers, and other application development specialists deploy newly-developed applications or updates to existing applications into a test environment of a software development pipeline and then provide appropriate inputs or data to the applications in the test environment. A function, analysis program, or other application may then provide values indicating the performance of the application and the results of the application. These values may be used as inputs to determine whether a set of rules corresponding to the application or type of application is satisfied. In many cases, rules built for testing one application or type of application may be reused for other applications or application types. However, while these rules may be manageable for small organizations, testing environments may collect a significant number of rules such that applications that fail a particular rule may later be deemed acceptable for deployment in a production environment. These exceptions may scale with the number of rules and size of the testing environment, resulting in the premature retirement of a rule, unnecessary delays in application deployment into a production environment, and the accidental deployment of buggy applications.

Some embodiments may use a learning model to analyze rule results applied onto application results or performance metrics related to an application's operations. Some embodiments may execute the learning model in a software development pipeline to determine the value of rules and modify rule weights based on the specific application or type of application being tested. Some embodiments may provide a neural network or another machine learning model with metrics obtained from the execution of an application in a test environment to determine rule-related weights for validation rules used to test the metrics. Such rule-related weights may be used to indicate the importance of certain rules, where the relative importance of rules may vary in accordance with different applications in the test environment. Some embodiments may then use the rule-related weights to scale a set of application pool results with the rule-related weights and determine whether the scaled application rule result satisfy or fail an allowance threshold. The allowance threshold may be configured to validate an application and indicate that the application is suitable for deployment into a production environment.

In some embodiments, a developer or other software development pipeline user may deploy an application into a production environment even if the application had failed one or more rules in the test environment. Some embodiments may detect this deployment and update an identifier of the application or rule results of rules in a test environment related to the application to indicate that the application was deployed to a production environment. Some embodiments may then use this stored data to retrain the learning model based on the updated application rule results. Some embodiments may then provide the retrained neural network with the application rule results to determine updated rule-related weights. Scaling the application rule results of the application with the updated rule-related weights may cause some embodiments to determine that the updated, scaled results satisfy the allowance threshold.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
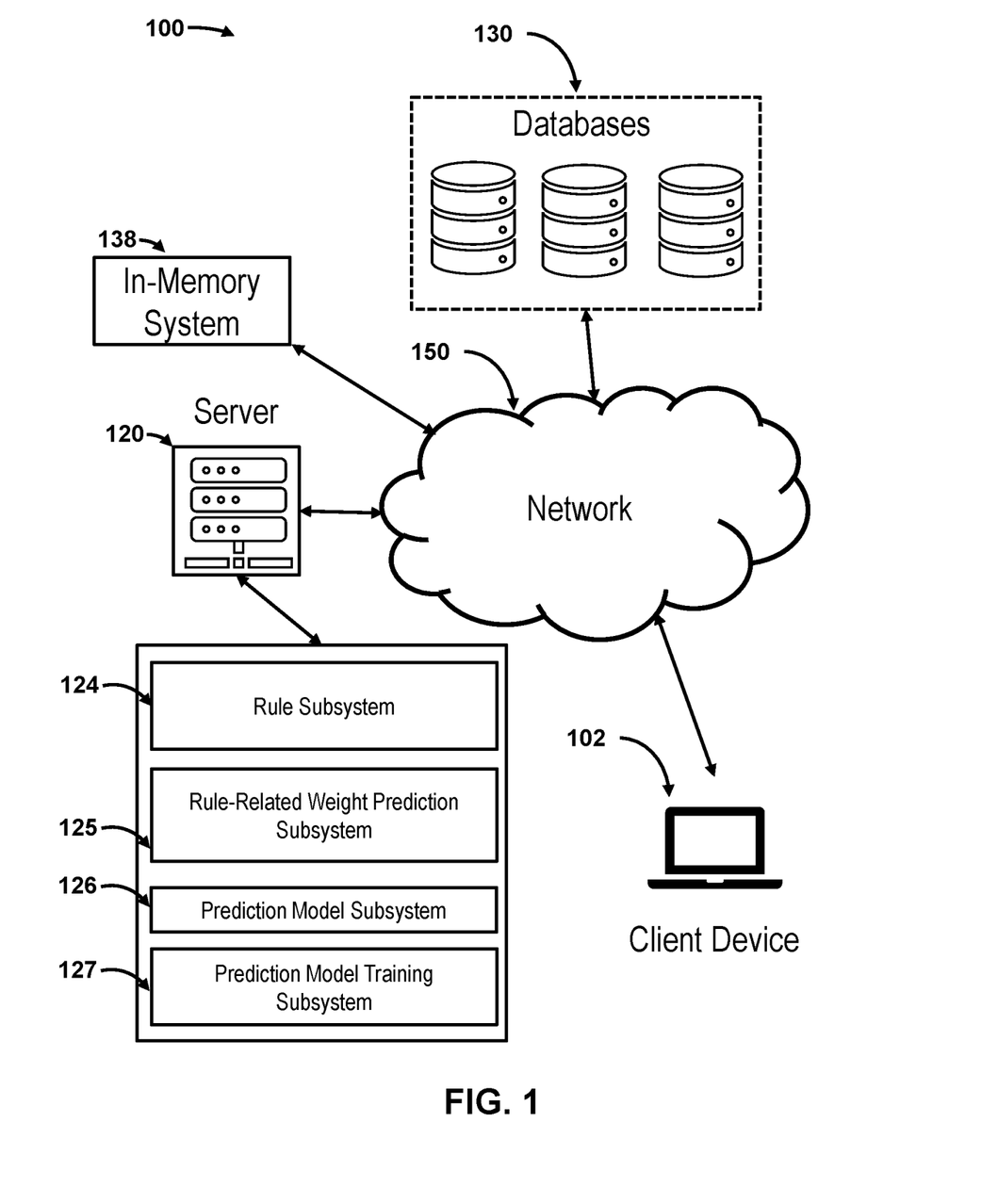
FIG. 1 shows an illustrative system for determining whether to deploy an application into a production environment of a software development pipeline, in accordance with one or more embodiments.

FIG. 1 shows an illustrative system for determining whether to deploy an application into a production environment of a software development pipeline, in accordance with one or more embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage medium storing program instructions to perform one or more operations of subsystems 124-126. A user may access a test environment executing on the server 120 from the client device 102 via the network 150. Further, while one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, although some embodiments are described herein with respect to machine learning models, other prediction models (e.g., a statistical model) may be used instead of or in addition to the machine learning models. For example, a probabilistic model may be used to replace a neural network model in one or more embodiments to determine a rule-related weight or another value. Furthermore, some embodiments may communicate with an API of a third-party data service via the network 150 to perform some operations of an application being tested, obtain externally-stored rules, use validation services, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include various values used to perform operations described in this disclosure, such as test data, application results, rule results, machine learning training data, learning model parameters, other prediction model parameters, etc. For example, records of the set of databases 130 may include rule results of an application and an indication that an application was deployed to a production environment from a test environment. In addition, the client computing device 102 or the server 120 may access data stored in an in-memory system 138, where the in-memory system may include an in-memory data store that stores data in a key-value data store such as Redis™. Some embodiments may store learning model parameters, rule results, or other data in an in-memory data store to accelerate data retrieval or learning model operations.

Subsystems 124-126

In some embodiments, the application testing subsystem 124 may obtain test data for a set of application code to be tested in a test environment. The test data may include simulated records, copies of data from production environments, application-specific data, test inputs, etc. The test environment may execute testing scripts that use instructions or values stored in configuration files. Some embodiments may provide test data to the set of application code to be tested and cause the executed applications of the set of application code to perform one or more application-specific operations to determine application results. The application results may include outputs of an execution of the application code, such as text outputs, changes to records, messages sent to external systems, etc. Alternatively, or in addition, application results may include application metrics indicating application performance, where the application metrics may be stored as quantitative values, Boolean values, categorical values, or other types of values. The metrics may include measurements of the speed at which the application performs, measurements of memory consumed, measurements of an amount of processor resources consumed, other values indicating an amount or type of computing resources used by the application, measurements of network traffic caused by one or more operations of the application, other measurements of network resources, values indicating changes to records of a database, etc.

Scripts, functions, or other executions of program code in the test environment may determine whether the application results satisfy a set of rules stored in or otherwise accessible from the test environment. Some embodiments may access a set of configuration files to determine a set of rules to apply and determine whether a set of application results satisfy the set of rules. Satisfying the set of rules based on the set of application results may include satisfying a criterion related to avoidance of records with duplicate values (e.g., requiring that such records not be generated), avoidance of records with missing values (e.g., requiring that such records not be generated), system resource consumption (e.g., not to exceed a quantitative threshold), network resource consumption (e.g., not to exceed a quantitative threshold), etc. For example, some embodiments may perform operations to determine whether a record change caused by an application in the test environment creates a record with missing attributes in a table.

In some embodiments, the rule-related weight prediction subsystem 125 may use the set of rule results, application results, or other data associated with an application to determine rule-related weights associated with the application. In some embodiments, a rule result of an application may include values indicating whether application outputs or application metrics of the application satisfy or do not satisfy a corresponding rule of the rule result. For example, some embodiments may provide a neural network with a set of application metrics obtained from executing the application in the test environment. The neural network may generate a set of weights associated with the set of rules used to test the set of weights based on the application metrics. Alternatively, or in addition, some embodiments may use other machine learning models to generate the rule-related weights. For example, some embodiments may use support vector machines or a random forest learning model to determine values to use as rule-related weights.

Some embodiments may modify the application metrics or other input values to the neural network by binning the input values into a set of categories or otherwise categorizing the input values. For example, some embodiments may obtain an application metric indicating a number of record changes caused by an application. Some embodiments may then associate a category with an application based on whether a number of record changes caused by the application are greater than or less than a threshold value. For example, some embodiments may associate the category "multiple record changes" with the application.

Some embodiments may apply one or more thresholds to the rule-related weights to reduce the risks of a new weight for a rule being assigned a value that is significantly lesser than or greater than a previous weight associated with the rule. For example, some embodiments may obtain a first rule associated with the detected generation of a duplicate entry and determine that a rule-related weight associated with the first rule is equal to 0.9 for a first application. Some embodiments may then determine that a weight associated with the first rule is equal to 0.8 for a second application. Some embodiments may then determine whether the difference between the first weight value and the second weight value satisfies a weight deviation threshold. For example, some embodiments may obtain a pre-determined weight deviation threshold from a database or obtain a user-entered weight deviation threshold from a user interface. Some embodiments may then determine that a weight deviation threshold is satisfied if the difference between a first and second weight value is less than the weight deviation threshold, where the difference may be an absolute difference or a relative difference. Alternatively, or in addition, some embodiments may determine that a weight deviation threshold is satisfied if a ratio or other comparison value between the first and second rule-related weight values satisfies the weight deviation threshold.

Some embodiments may then determine whether or not application code should be deployed on a production environment based on the weighted rule results by determining a decision score based on the weighted rule results. For example, some embodiments may determine a set of rule results indicating that a first rule has been satisfied by the application results of the application and that a second neural has not been satisfied by the application results of the application. Some embodiments may set rule-related weights of each rule to 1.0 or some other pre-determine number such that each rule which is satisfied contributes its rule-related weight to a decision score (e.g., in the form of a weighted sum). Alternatively, some embodiments may assign different rule-related weights to different roles. For example, a first law may be associated with a rule-related weight equal to 1.0, and a second rule may be associated with a rule-related weight equal to 0.5, where each rule-related weight may be used to determine the value of an allowance threshold. In some embodiments, satisfying an allowance threshold with a decision score for application code may indicate that the application may be deployed to a production environment. As described elsewhere in this disclosure, a decision score may be determined based on a set of rule results, where the set of rule results may include rule results modified by a rule-related weight. For example, a decision score may be or otherwise include a sum of quantized rule results modified by an associated set of rule-related weights. Some embodiments may then determine that the application satisfies the allowance threshold based on a determination that the sum of the rule-related weights satisfies the allowance threshold.

Alternatively, some embodiments may use the second neural network independently of any rule-related weights. For example, some embodiments may provide the second neural network with a set of application results or rule results of an application to determine a first decision score. Some embodiments may then use rule-related weights to make decisions when a discrepancy exists between rule results and a machine learning decision. In response to a determination that one or more rules were failed based on the application results of an application and that the decision score satisfies a set of allowance criteria, some embodiments may use a second machine learning model to determine rule-related weights and determine a second decision score based on the rule-related weights and the application results. Some embodiments may then determine whether an application (e.g., a new application, a new version of an existing application, etc.) should be deployed based on whether the second decision score satisfies a second set of allowance criteria.

In some embodiments, a prediction model subsystem 126 may indicate that application code is to be deployed to a production environment or not to be deployed to the production environment. Some embodiments may directly use a set of weighted rule results by determining a decision score based on a sum of the weighted rule results. Alternatively, or in addition, some embodiments may use another machine learning model, such as another neural network, to determine whether to indicate that application code is deployable to a production environment. In some embodiments, the inputs to this other machine learning model may include the rule results of application code. Some embodiments may modify the rule results with their corresponding rule-related weights before using the modified rule results as inputs for the neural network. For example, some embodiments may use a first neural network to determine a set of rule-related weights for several results and then use the rule-related weights to modify rule results before using the modified rule results as inputs for a second neural network to determine whether or not an application should be deployed to a production environment.

In some embodiments, a prediction model training subsystem 127 may detect the deployment of application code indicated to have failed one or more rules of a test environment. As described elsewhere in this disclosure, deploying application code may include deploying a new application, deploying an update to application already deployed in a production environment, etc. Various operations may be performed to determine if an application indicated to have failed one or more rules had still been deployed a production environment. For example, some embodiments may track versions of an application and determine that an application has been deployed environment based on a determination that a version number of the application in the test environment is equal to a version number deployed to the production environment. Alternatively, some embodiments may check a set of records indicating that an application has been deployed to a production environment from a test environment.

The prediction model training subsystem 127 may update a set of rule result records to indicate that an application associated with the rule results has been deployed. Some embodiments may then perform a set of re-training operations that may reduce one or more rule-related weights associated with a failed rule. For example, some embodiments may re-train a neural network based on a set of rule results associated with an application that was later indicated to have been deployed such that the weight associated with a failed rule of the rule results is set to a lesser value. Some embodiments may then re-determine a set of rule-related weights based on a new set of rule results of a different application, such as an application update to an existing application, where the new set of rule results may be similar to or the same as that of first set of rule results. Some embodiments may then modify the new set of rule results based on the new rule-related weights, determine a decision score based on the modified new set of rule results, and determine that the new application should be deployed to a production environment.

Figure 2:
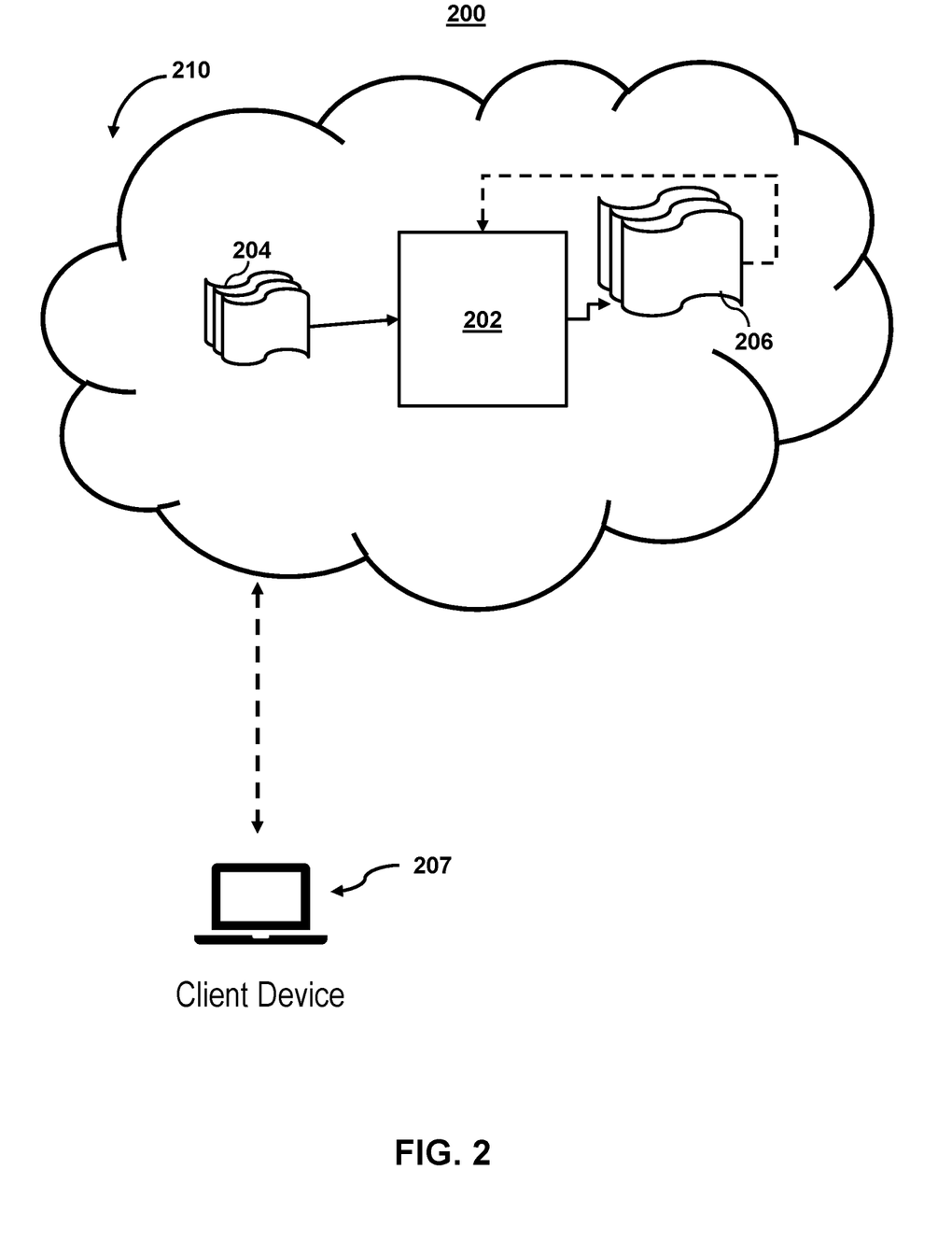
FIG. 2 shows an illustrative diagram of a system for predicting rule-related weights or other values, in accordance with one or more embodiments.

FIG. 2 shows an illustrative diagram of a system for predicting rule-related weights or other values, in accordance with one or more embodiments. A system 200 may include computing device 207, where the computing device 207 may be any computing device, including, but not limited to, a smartphone, a laptop computer, etc. FIG. 2 also includes cloud system 210 implemented on a distributed computer system, where the cloud system 210 may include any computing device described in this disclosure or any other type of mobile computing device, fixed computing device, or other computing device. In some embodiments, the distributed computer system may include a set of computing nodes such as a set of servers or remote computing devices operated by a third party, where the cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computing device 102, the server 120, the network 150, or the set of databases 130. For example, the set of databases 130 may each be controlled by different computing nodes of the set of computing nodes, and a query received by the set of databases 130 may cause each node of the set of computing nodes to perform a search based on the query. For example, some embodiments may send a query to the cloud system 210 to retrieve test data for executing an instance of application code.

In some embodiments, the cloud system 210 may include a machine learning model 202. The machine learning model 202 may take inputs 204 and provide outputs 206. The inputs may include multiple datasets, such as a training dataset and a test dataset. For example, some embodiments may store an indication that application code was deployed or scheduled for deployment into a production environment even if an execution of the application code had failed one or more rules in a test environment. Some embodiments may then use the indication as a training objective or as an input of a training objective. Each dataset of the multiple datasets (e.g., inputs 204) may include data subsets related to the rule results, metrics, rule-related weights, whether an application was deployed to a production environment, etc. In some embodiments, outputs 206 may be fed back to the machine learning model 202 as input to train the machine learning model 202. For example, the outputs 206 may be used to determine a set of rule-related weights that are then used to modify a set of rule results or an allowance threshold. An indication that application code was selected for deployment in a production environment may cause some embodiments to be trained to generate rule-related weights that causes an allowance threshold to be satisfied by the set of rule results associated with the application.

In some embodiments, the machine learning model 202 may include an artificial neural network. In such embodiments, machine learning model 202 may include an input layer and one or more hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

In some embodiments, machine learning model 202 may update its configurations (e.g., weights, biases, or other parameters) based on the outputs 206 and reference feedback information (e.g., user indication of accuracy, reference vectors, or other information). In some embodiments, such as where machine learning model 202 is a neural network, connection weights may be adjusted to reconcile differences between the neural network's prediction and reference feedback. For example, an output layer of the machine learning model 202 may correspond to a category and a field identifier or field descriptor known to correspond to that classification may be provided to an input layer of the machine learning model 202 during training.

In some embodiments, machine learning model 202 may include multiple layers (e.g., where a signal path traverses from front layers to back layers). In some embodiments, the machine learning model 202 may use backpropagation techniques, where forward stimulation is used to reset weights on the "front" neural units. For example, one or more neurons (or cells) of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate better predictions. In some embodiments, stimulation and inhibition operations for the machine learning model 202 may be more free-flowing, with connections interacting in a more chaotic and complex fashion.

Figure 3:
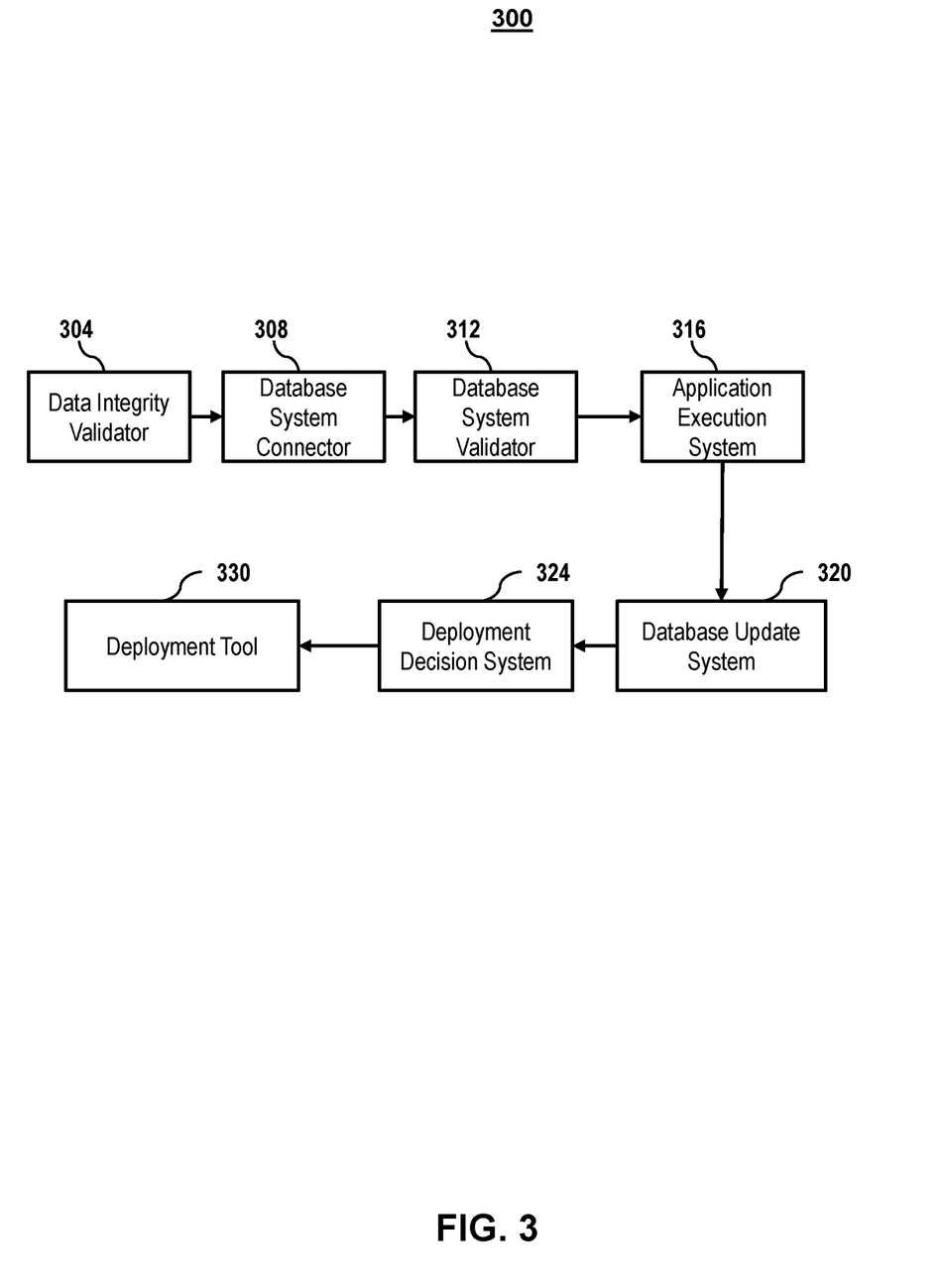
FIG. 3 shows a conceptual diagram of software development pipeline.

FIG. 3 shows a conceptual diagram of software development pipeline. The software development pipeline 300 may be hosted in a test environment. In some embodiments, using the software development pipeline 300 may include operations to obtain a committed set of application code. The committed code may have been transferred into a test environment from an initial development environment. For example, after a developer commits and transfers a set of application code that updates an existing application, some embodiments may transfer the committed application code and its corresponding version number into a development environment. After obtaining the application code, some embodiments may use a data integrity validator 304 to perform data integrity validation operations on a set of input data. For example, the data inspected by the data integrity validator 304 may perform operations on data migrated into the test environment that is used by or otherwise associated with application code, where this data may then be transferred to a set of tests data.

The data integrity validator 304 may perform related operations, such as repairing data. Repairing data may include converting data into an appropriate type, truncating digits or letters, deleting unrecognized representations of data, etc. Some embodiments may then use a database system connector 308 to connect to test data or other data used in a test environment. For example, some embodiments may access test data, including user data, customer data, context values indicating server or device health, account data based on transactions associated with a user identifier, etc. After obtaining access to data via the database system connector 308, some embodiments may perform validation operations on the database system using a database system validator 312.

Once the database system validator 312 has validated the data accessed by a connection established using the database system connector 308, some embodiments may execute an application in the test environment using an application execution system 316. Furthermore, some embodiments may update a database system via a database update system 320, which may use a connection established using the database system connector 308. Some embodiments may then apply a set of validation rules or other rules based on a set of outputs generated from executing the application and changes to the data stored in the database system accessed via a connection established by the database system connector 308.

Based on the rule results of the validation rules or other rules, some embodiments may use a deployment decision system 320 to determine whether an application may be deployed in a production. For example, some embodiments may use a machine learning model employment decision system 320 to determine a set of rule-related weights for a set of validation rules or other rules based on application outputs or metrics indicating application performance during the execution of the application, the test environment. Some embodiments may then determine whether or not to deploy an application based on the set of rule results and the rule-related weights associated with the rules of the rule results. Some embodiments may then use a deployment tool 330 to deploy application code from the test environment to a production environment.

Some embodiments may detect that the deployment tool 330 was used to deploy application code that had failed one or more rules used by the deployment decision system 324 in a test environment. In response, some embodiments may update parameters used by the deployment decision system 324 by retraining a machine learning model to generate an updated set of rule-related weights based on the rule results of an execution of the application code. Furthermore, some embodiments may detect that application code in a production environment deployment tool had experienced a rollback operation, where program code in the production environment had been rolled back to an earlier version. Some embodiments may determine whether an execution of the rolled-back program code had failed one or more rules. In response to a determination that the rolled-back program code had failed one or more rules, some embodiments may update a machine learning model to increase the weights associated with the failed rule(s).

Figure 4:
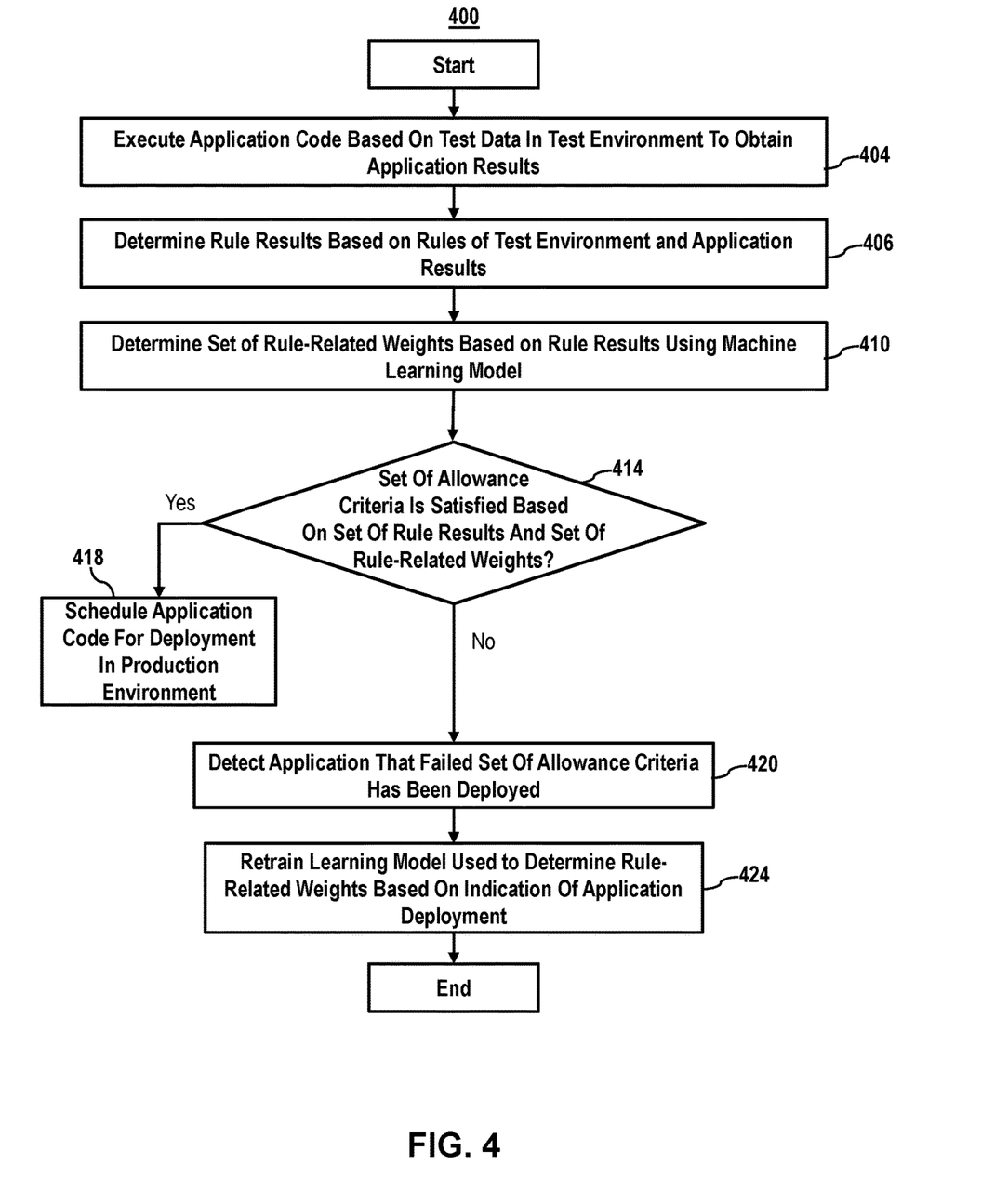
FIG. 4 shows a flowchart of a process to train and use a learning model for rule-related weights application development, in accordance with one or more embodiments.

FIG. 4 shows a flowchart of a process to train and use a learning model for rule-related weights application development, in accordance with one or more embodiments. Some embodiments may execute application code based on test data in a test environment to obtain a set of application results, as indicated by block 404. Executing application code may include compiling application code and executing the compiled application code, where the compiled application code may include a new application or an update to an existing application. For example, some embodiments may test an application update, where the application update may include a new module of an existing application and an update to a specific feature of the application. The compiled application code may be programmed to perform various types of operations, such as displaying data into a user device, modifying records in a database, sending messages to external APIs, performing calculations based on one or more user inputs, etc. For example, some embodiments may provide a compiled application in the test environment with a set of inputs that causes the application to update a user record and a transaction record related to the user record.

During or after executing the application, some embodiments may obtain application results, such as application outputs of an application or application metrics indicating the performance of the application. An application output may include direct outputs of an application, such as printouts to a terminal, messages sent to an API, updates to a record, etc. For example, some embodiments may obtain an application output in the form of an update to a record. An application result may also include metrics of application performance or metrics of the application outputs. For example, some embodiments may determine an amount of computation time required to perform an operation of the application based on a set of test data and use the amount of computation time as an application metric. In some embodiments, the application metric may be a categorical or Boolean value. For example, some embodiments may select the category "multiple records updated" and use this category as an application metric based on a determination that the application had updated multiple records of a database.

Some embodiments may determine a set of rule results based on rules of a test environment and the application results, as indicated by block 406. The rules of the test environment may include application-specific rules. For example, some embodiments may apply a rule to a set of application results to determine if the results of an updated application include a specific type of output. Alternatively, some embodiments may apply rules that apply to multiple applications. For example, some embodiments determine whether an updated application satisfies a rule that all applications that access a database access the database less than a threshold number of times.

A set of rule results may be represented in various ways, such as a set of Boolean values, a set of categorical values, or a set of quantitative values. Some embodiments may store a set of rule results as a list, array, or vector. For example, some embodiments may determine that application results of executed application code may have failed a first rule, satisfied a second rule, and satisfied a third rule. Some embodiments may then store the rule as a vector "[0.0, 1.0, 1.0]."

Some embodiments may determine a set of rule-related weights based on the application results using a machine learning model, as indicated by block 410. Some embodiments may provide metrics such as numeric values, categorical values, or other values to a machine learning model two determine the set of rule-related weights associated with rules of a test environment. For example, some embodiments may provide a feedforward neural network, recurrent neural network, transformer neural network, or another type of neural network with a set of metrics. The set of metrics may include values such as a network resource consumption amount, a count of records affected by the application, a count of missing values in records generated by the application, and a count of duplicate values generated by the application, etc.

The machine learning model may use the provided set of metrics to determine a set of weights associated with the set of rules. For example, some embodiments may use a deep neural network to determine a first weight for a first rule and a second weight for a second rule based on a first set of rule results. Some embodiments may then use the same deep neural network to determine a third weight for the first rule and a fourth weight for the second rule based on a second set of rule results different from the first rule results. In some embodiments, the rule-related weights may be limited to values ranging from zero to a pre-determined normalization value. For example, the rule-related weights may limited to values in the range 0.0 to 1.0. Alternatively, the rule-related weights may be limited to other ranges, where the lower limit may be greater or lesser than zero, and the upper limit may be greater or lesser than 1.0.

Some embodiments may determine whether a set of allowance criteria is satisfied based on the set of rule results and the set of rule-related weights, as indicated by block 414. Some embodiments may modify a set of rule results by setting a value representing the rule state for an application to a first value if the rule is satisfied and setting the rule result to a second value if the value is not satisfied. For example, some embodiments may set the rule result of a rule to a first value of 1.0 if the rule is satisfied and set the rule result of the rule to a second value of 0.0 if the rule is not satisfied. Some embodiments may then modify the rule results based on the set of rule-related weights. For example, some embodiments may determine that a first rule-related weight associated with a first rule may be equal to 0.5 and multiply a rule result of 0.9 by the first rule-related weight to determine a modified rule result of 0.45.

The modified set of rule results may then be combined to determine a decision score, where combining values may include adding the values, multiplying values, or performing some other operation based on the modified set of rule results. For example, some embodiments may combine a first modified rule result of 0.9, 0.8, and 0.6 by adding each of these values to obtain a sum of 2.3 and using the sum as a decision score. Some embodiments may then compare this decision with an allowance threshold, where exceeding the allowance threshold indicates that the application should be deployed. Alternatively, or in addition, some embodiments may modify a set of criteria based on the rule-related weights. For example, some embodiments may set an allowance threshold to be equal to the sum of each weight of a set of rule-related weights without modifying the rule results.

Some embodiments may perform operations that include both combining values and requiring that certain rules be satisfied in order to indicate that an application may be deployed in a production environment. For example, some embodiments may determine rule results for a first rule, second rule, and third. Some embodiments may further determine a rule-related weight for the first rule, the second rule, and the third rule. When determining the weight for the third rule, some embodiments may assign a weight that makes the third rule required to be satisfied. Alternatively, or in addition, some embodiments may assign an additional value to the third rule, where the additional value indicates that the third rule must be satisfied.

Some embodiments may update the criteria for a rule based on context values associated with the test environment or computing resources available to the test environment. For example, some embodiments may receive an indication that one or more computing resources associated with the test environment had been taken off-line. Such an indication may be directly provided by a user during the use of a machine learning model or may be obtained from other data. For example, some embodiments may retrieve a set of event logs or a server storing data that was updated by an application. Some embodiments may determine that the event log indicates a performance-impacting event during the operation performed by the application. In response to a determination that the server had suffered from a performance-impacting event unrelated to the application being tested, some embodiments may modify a rule-related weight associated with a rule that is satisfied based on a metric associated with the performance metric. In some embodiments, the modification of the rule-related weight may cause failing the rule to have a reduced effect on a determination of whether the application should be deployed in a production environment. For example, some embodiments may provide a neural network with a set of rule results and a context value indicating a performance-impacting event and obtain a first rule-related weight for a rule. Some embodiments may then provide the neural network with the same set of rule results without the context value to obtain a second rule-related weight for the same rule, where the second rule-related weight is greater than the first rule-related weight.

Some embodiments may include operations to search through the event log and relate events to a specific rule. For example, some embodiments may detect that a data migration event or a resource outage event occurred or otherwise affected database, computing process, or other operation. Some embodiments may perform operations to search through rules and determine whether the rules include criteria based on network performance, computation time, or record updates based on the performance. For example, a set of rules may be written as a set of Python scripts to be executed after application code for an application is executed in the test environment. Some embodiments may search through the variables or API calls of the Python script to determine whether the script measures an indication of performance associated with a computing resource used by the application (e.g., an amount of memory consumed, an amount of processor resources consumed, an amount of bandwidth consumed, a latency, etc.). Alternatively, or in addition, some embodiments may search through metadata or comments associated with the script for a rule to determine whether a calculation of a weight for the rule should include an indication of a context value.

Some embodiments may use another machine learning model to predict whether or not an application should be deployed to a production environment based on modified rule results. For example, some embodiments may use a first neural network to generate rule-based weights for a set of rules and generate modified rule results using the rule-based weights. Some embodiments may then use the modified rule results as inputs for a second neural network to determine an output value, where the output value of the second neural network may be used a decision score and compared to an allowance threshold. For example, some embodiments may multiply a vector representing initial rule results (e.g., where 0 represents failing a rule and 1 represents satisfying a rule). Some embodiments may determine that the application associated with the modified rule results should be deployed in response to a determination that the output value of the second neural network satisfies the allowance threshold. Furthermore, some embodiments may provide the second neural network with additional input values, such as context values, application importance, or other values.

Some embodiments may perform operations to skip using a machine learning model to predict whether or not an application should be deployed based on a set of rule results. For example, some embodiments may obtain and execute an additional application in a test environment to determine a set of metrics for the additional application. In some embodiments, the set of metrics may satisfy a corresponding first set of validation rules, where satisfying the first set of validation rules may cause some embodiments to schedule the additional application for deployment based on the rule results indicating that the set of metrics satisfy the first set of rules without using the second neural network described above. Similarly, if another machine learning model is used as an alternative to or in addition to the second neural network, some embodiments may determine that the additional application should be scheduled for deployment.

Some embodiments may detect that a new rule has been added to the set of rules stored in a test environment. In response to the new rule being added, some embodiments may generate new rule results based on the new rule indicating a rule satisfaction state of each application in a set of applications to be tested. For example, after detecting that a rule has been added to a set of rules of a test environment, some embodiments may obtain a list of application updates to be deployed to a production environment from the test environment and determine which application updates of the list satisfy the new rule. After determining a rule result for each application update, some embodiments may perform a training operation to determine a new rule-related weight for the new rule. Furthermore, some embodiments may update a threshold to account for the or otherwise update a set of allowance criteria based on the new rule. For example, some embodiments may add 1.0 to the value of an allowance threshold after detecting the new rule.

After being provided with a new application for testing in the test environment, some embodiments may further determine that the new application has failed the new rule. Some embodiments may then determine a new weight for the new rule, where the rule results of the new application may be modified by a set of rule-related weights that includes the new weight. Some embodiments may further determine that the machine learning model used to generate the new rule-related weight has been insufficiently trained based on a number of training samples. In response, some embodiments indicate that a user should examine the new application code before permitting the new application code to be added to a list of deployable application code.

Alternatively, or in addition, some embodiments may test a set of previously tested applications based on a newly added rule, where the set of previously-tested applications may have been tested within a predetermined duration. The predetermined duration may include a duration that is less than one day, less than one week, less than one month, or some other period of time. For example, after detecting that a new rule had been added to a set of rules in a test environment, some embodiments may search through a list of applications that had been tested in the test environment in the last two weeks. Some embodiments may then perform operations to retest each of the applications in this list of applications based on the new rule and train a machine learning model to predict a ruler weight for the new rule based on the rule results.

As described elsewhere in this disclosure, some embodiments may represent rule satisfaction states in the form of vectors, where each application may be associated with a n-dimensional vector representing the application rule satisfaction state. The value for "n" may be an integer greater than three, such as five, ten, an integer greater than 50, an integer greater than 100, an integer greater than 1000, or some other integer. For example, if each application is tested with a set of 50 rules, some embodiments may represent the rule results of each application in the form of an n-dimensional vector, where "n is equal to 50. Some embodiments may modify values of the in-dimensional vector with the rule-related weights generated from a machine learning model. For example, some embodiments may generate an initial vector representing the rule satisfaction state of five rules for an application, where some embodiments may represent the initial vector as "[1.0, 1.0, 1.0, 1.0, 0.0]." Some embodiments may then determine a set of rule-related weights based on the rule results, a set of context values (e.g., context values representing server outages, data migrations, etc.), and a category of the application using a machine learning model, where the set of rule-related weights is equal to "[0.6, 1.0, 1.0, 1.0, 0.5]." Some embodiments may then modify the initial vector with the set of rule-related weights, where modifying the initial vector may include determining an element-wise product of the initial vector and the rule-related weights, which may result in a vector "[0.6, 1.0, 1.0, 1.0, 0.5]."

Some embodiments may filter a plurality of vectors representing rule results of a plurality of applications into a subset of vectors. Each application associated with a vector in the subset of vectors may be an application deployed to a production environment from a test environment. Some embodiments may then generate an N-dimensional boundary in the dimension space of the vectors. Some embodiments may then determine whether a vector representing rule results associated with the new application (i.e., a new full application or an application update) is within the N-dimensional boundary. Some embodiments may require that the vector of the new application is within the n-dimensional boundary. For example, after obtaining a new application, some embodiments may apply a set of rules to the new application to determine rule results of the new application and determine a set of rule-related weights based on the rule results of the new application. Some embodiments may then modify the rule results based on the several related weights and determine whether the modified rule results are within the N-dimensional boundary. Some embodiments may then determine that the modified rule results are within the N-dimensional boundary and, in response, indicate that the new application satisfies an allowance criterion. Alternatively, some embodiments may require that the modified rule results are within the in-dimensional boundary but also require that an allowance threshold be satisfied by a decision score of the application.

As described elsewhere in this disclosure, some embodiments may require that a subset of rules be satisfied in order for application code to be indicated as deployable in a production environment. For example, some embodiments may determine that an application code is associated with a modified set of rule results, where the modified set of rule results may be used to determine a decision score that satisfies a set of allowance criteria. Some embodiments may then determine that a required rule of the set of rules is not satisfied by the set of rule results and, in response, determine that the application should not be deployed in a production environment.

Alternatively, or in addition, some embodiments may perform operations to indicate that a second application may be deployed in a production environment without using a machine learning model. Some embodiments may determine that satisfying a pre-determined subset of a set of rules may be sufficient to result in a determination that a set of application code is deployable to a production environment. For example, based on a determination that an application satisfies a pre-determined subset of rules, some embodiments may indicate that the application may be deployed without using a machine learning model to generate a set rule-related weights based on rule results of the application. Furthermore, some embodiments may deploy this application or schedule this application for deployment into the production environment.

Some embodiments may determine that a weight assigned to a rule is less than a weight threshold. A rule that is assigned with a weight that is less than a week threshold may indicate that the rule is obsolete or is otherwise inapplicable to an application. For example, some embodiments may determine that a rule-related weight for a rule is less than a weight threshold of 0.1. In response, embodiments may generate a specific indicator for the rule, or add an identifier of the rule to a list of rules that may be scheduled for deprecation.

In response to a determination that the set of allowance criteria is satisfied based on the set of rule results and set of rule-related weights, operations of the flowchart 400 may proceed to block 418. Otherwise, operations of the flowchart 400 may proceed to block 420.

Some embodiments may schedule application code for deployment into a production environment, as indicated by block 418. For example, some embodiments may determine that a set of rule results satisfy a set of allowance criteria. The set of rule results may be determined based on a set of application results of an application in the test environment. Some embodiments may then assign the application to a deployment schedule using an automated system, where each application identified in the deployment schedule is scheduled for deployment from the test environment into a production environment.

Some embodiments may distinguish between applications that have been manually selected for deployment by a user and applications that have been automatically added to a deployment schedule. Furthermore, some embodiments may apply different scheduling rules for applications selected for deployment by a user and applications selected for deployment by an automated system. For example, some embodiments may determine that the next deployment of applications into a production environment is too early based on a minimum duration from a current time to the deployment time into the production environment. The minimum duration may include a duration that is less than one hour, six hours, one day, two days, one week, one month, or some other duration. Based on a determination that the next deployment is too early based on the minimum duration, some embodiments may schedule an application for deployment at a later deployment time without changing the deployment time of a user-selected application for deployment.

Some embodiments may determine that an application had been deployed to a production environment even if the application had failed a set of allowance criteria, as indicated by block 420. As described elsewhere in this disclosure, a software developer, DevOps manager, or another user of a software development pipeline may be permitted to deploy an application to a production environment even if the application had failed one or more allowance criteria. Some embodiments may detect this change and update a set of records associated with the application, such as updating a set of rule results for an application or data associated with the rule results to indicate that the application was later deployed in a production environment.

Some embodiments may retrain the learning model used to determine rule-related weights based on the indication of application deployment, as indicated by block 424. Some embodiments may perform a retraining operation to modify parameters of a machine learning model used to generate rule-related weights. In some embodiments, the rule results of the application used for retraining may include or be associated with an indicator, where the indicator may indicate that the application had failed an allowance criterion but was deployed in a production environment or scheduled for deployment in the production environment. For example, after having determined that a rule result indicated that a set of rule results modified by a set of rule-related weights had failed an allowance criterion, some embodiments may determine that the application should not be deployed to a production environment. After detecting that the application had been selected for a scheduled deployment by a user, some embodiments may store or update an indication that the application had been selected for a scheduled deployment into a production environment.

Some embodiments may perform operations to account for the possibility that, in most cases, a user will not have selected an application that had failed one or more rules for deployment. Cases for which a user had selected an application for deployment despite the application failed one or more rules will be relatively few in number. To account for a possible lack of data, some embodiments may generate additional simulated cases for which a user may select an application for deployment even if the application had failed a set of rules.

Some embodiments may generate simulated rule results based on actual rule results and display a set of user interface elements for a user to view. The user may be able to provide feedback on the simulated examples of the rule results to indicate whether or not the user would have deployed the application in a production environment based on the simulated rule results. For example, some embodiments may generate a set of simulated training data based on a first set of rule results for an application that was later deployed to in production environment. Some embodiments may present the simulated data to a user during the users deployment operation. For example, after detecting that a user had selected an application for deployment. Despite the application having failed a set of allowance criteria, some embodiments may obtain the rule results associated with the application and generate additional rule results based on the rule results of the application. Some embodiments may vary the numeric values of a set of rule results of an application that was deployed to a production environment. The variation may be by a percentage, such as a value less than 5%, a value less than 10%, a value less than 20%, or some other value.

After retraining a weight-generating machine learning model, some embodiments may perform operations to test another new application or a new application update to an existing application. For example, some embodiments may execute a second application in a test environment after retraining a machine learning model used to generate rule-based weights. Some embodiments may use the retraining machine learning model to generate a new set of rule-based weights for the rule results of the second application. After modifying the set of rule results of the second application with the new set of rule-based weights, some embodiments may determine that the second application should be deployed in a production environment in response to a determination that a set of modified rule results satisfy a set of allowance criteria.

Some embodiments may determine that a later update to an application is an update to an application that had already been tested, where a set of rule-based weights had been generated for a previous version of the application. For example, some embodiments may determine that a version number and identifier associated with application code indicates that the application code is an update to a previously tested application. Some embodiments may then perform operations to determine whether the updated application is similar in scope or performance to the earlier version of the application. For example, some embodiments may determine that a later update is similar to an earlier update based on a determination that the earlier update and later update affect the same test records based on the same test input, access the same APIs, access the same set of micro-services, etc. In response to a determination that the later update to the application is an update to a previously tested application, some embodiments may obtain rule-related weights associated with the previous version. By using the previously used weights, some embodiments may reduce computational load and reduce duplicative or near-duplicative computations.

Some embodiments may detect that a rollback event had occurred in the production environment, where a rollback event for an application may include an event such that the application in a production environment was reversed to a previous version of the application. Alternatively, the application may have been deleted in the production environment. Based on a determination that the rollback affected an application that failed a rule, some embodiments may increase a weight associated with the rule. For example, some embodiments may determine that a first application was modified by a rollback event in the production environment, where the application had previously been indicated to have failed a first rule. Some embodiments may then update a neural network or other machine learning model used to generate a rule-related weight for the first rule to increase the rule-related weight for the first rule. For example, some embodiments may re-train a first neural network used to generate rule-related weights with an updated set of training data that indicates that the first application should not have been deployed in the production environment.

The operations of each method presented in this disclosure are intended to be illustrative and non-limiting. It is contemplated that the operations or descriptions of FIG. 4 may be used with any other embodiment of this disclosure. In addition, the operations and descriptions described in relation to FIG. 4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 4.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or in addition, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or LTE network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-127 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-127 described herein is for illustrative purposes, and is not intended to be limiting, as any of subsystems 124-125 may provide more or less functionality than is described. For example, one or more of subsystems 124-127 may be eliminated, and some or all of its functionality may be provided by other ones of subsystems 124-127. As another example, additional subsystems may be programmed to perform some or all of the functionality attributed herein to one of subsystems 124-127.

With respect to the components of computing devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, indicated otherwise, updating an item may include generating the item or modifying an existing time. Thus, updating a record may include generating a record or modifying the value of already-generated value.

Enumerated Embodiments

The present techniques will be better understood with reference to the following enumerated embodiments:

1. A method comprising: providing a prediction model with a set of values obtained from an execution of an application in a first environment to determine a set of weights for a rule set; modifying a set of rule results with a set of weights; determining whether the modified rule results satisfies a set of criteria; in response to a determination that the modified rule result does not satisfy the set of criteria but that the application is selected for deployment in a second environment, storing the rule results and an indicator that the application is selected for deployment in the second environment in a collection of results; updating parameters of the prediction model based on the collection of results; providing the prediction model with the rule result to generate an updated set of weights after updating the parameters of the prediction model based on the collection of results; and updating the rule result based on the updated set of weights to determine an updated modified rule result.

2. The method of embodiment 1, wherein the set of rule results indicating which rules of the rule set are satisfied by the set of values.

3. The method of any embodiment of embodiments 1 to 2, wherein the updated modified rule result satisfies the set of criteria.

4. A method for training a prediction model for application deployment to a production environment by modifying rule-related weights associated with a rule set comprising: providing a neural network with metrics obtained from an execution of an application in a test environment to determine rule-related weights for validation rules; scaling rule results with the rule-related weights to determine scaled rule results, wherein the rule results indicate which rules of the validation rules are satisfied or failed by the metrics; in response to a determination that the scaled rule results fails a threshold but that the application is selected for deployment in a production environment, re-training the neural network with the rule results of the application, an indication that the executed application is selected for deployment in the production environment, and rule results of other applications in the test environment that are not selected for deployment in the production environment; providing the re-trained neural network with the rule results to generate updated rule-related weights; and scaling the rule results by the updated rule-related weights to determine updated scaled rule results, wherein the updated scaled rule results satisfy the threshold.

5. A method comprising: providing a machine learning model with metrics obtained from an execution of an application in a first environment to determine rule-related weights for validation rules; modifying rule results with the rule-related weights, wherein the rule results indicating which rules of the validation rules are satisfied or failed by the metrics; determining whether the modified rule results satisfies a threshold; in response to a determination that the modified rule results does not satisfy the threshold but that the application is selected for deployment in a second environment, storing the rule results and an indicator that the application is selected for deployment in the second environment in a collection of results; re-training the machine learning model based on the collection of results and rule results of other applications in the first environment that are not selected for deployment in the second environment; providing the re-trained machine learning model with the rule results to generate updated rule-related weights; and updating the rule results based on the updated rule-related weights to determine updated modified rule results, wherein the updated modified rule results satisfy the threshold.

6. The method of any embodiment of embodiments 1 to 5, wherein the application is a first application, the method further comprising: generating a plurality of vectors, wherein each respective vector of the plurality of vectors is associated with respective set of values of a respective application, and wherein the plurality of vectors comprises a first vector based on values of the first application; filtering the plurality of vectors to a subset of vectors, wherein each application associated with a vector of the subset of vectors is indicated to have been deployed in the second environment; determining an n-dimensional boundary in a dimension space of the plurality of vectors based on the subset of vectors, wherein n is an integer greater than three, wherein determining whether the modified rule results satisfies the set of criteria comprises determining whether the first vector is within the n-dimensional boundary.

7. The method of any embodiment of embodiments 1 to 6, the method further comprising: obtaining a second vector based on outputs of a version of a second application; receiving a message indicating that the version of the second application has been deployed in the second environment; determining whether the second vector is within the n-dimensional boundary; and based on a determination that the second vector is not within the n-dimensional boundary, updating the n-dimensional boundary based on the second vector.

8. The method of any embodiment of embodiments 1 to 7, wherein the application is a first application, the method further comprising: identifying a second application modified by a rollback event in the second environment; determining whether the second application failed a rule of the rule set in the first environment; and based on a determination that the second application failed the rule of the rule set, increasing a weight associated with the rule, wherein the set of weights comprises the weight.

9. The method of any embodiment of embodiments 1 to 8, the method further comprising: determining whether a weight associated with a first rule of the rule set is less than a weight threshold; and presenting an alert that the weight associated with the first rule is less than the weight threshold.

10. The method of any embodiment of embodiments 1 to 9, wherein the set of rule results is a first set of rule results, the method further comprising: determining that a second application should be deployed to the second environment based on a second set of rule results of the second application by: determining a second set of weights the prediction model; modifying the second set of rule results with the second set of weights to determine a modified second set of rule results; determining that the modified second set of rule results satisfies the set of criteria; scheduling the deployment of the second application based on a determination that the second application should be deployed to the second environment determining whether the deployment of the second application to the second environment is scheduled for a time that satisfies a minimum duration; in response to a determination that the minimum duration is not satisfied, scheduling the second application in the second environment for a later deployment time.

11. The method of any embodiment of embodiments 1 to 10, wherein the set of values of the application comprise an amount of memory consumed, an amount of processor resources consumed, or an amount of network resources consumed.

12. The method of any embodiment of embodiments 1 to 11, wherein the rule results are first rule results, further comprising: obtaining a weight deviation threshold; executing a second application in the test environment to generate a second database-related metric and second rule results indicating a same failed rule as the first rule results; and providing the neural network with the second rule results to determine second rule-related weights, wherein a difference between a first weight of the updated rule-related weights and a second weight of the second rule-related weights is less than the weight deviation threshold.

13. The method of any embodiment of embodiments 1 to 12, wherein the neural network is a first machine learning model, the method further comprising: providing a second neural network with the metrics to determine a decision score, whether the application should be deployed in the production environment, wherein providing the first neural network with the metrics comprises: determining whether the decision score satisfies a threshold indicating that the application should be deployed; and in response to a determination that the decision score satisfies the threshold indicating that the application should be deployed and that the rule results indicates that a rule of the validation rules has been failed, providing the first neural network with the metrics.

14. The method of any embodiment of embodiments 1 to 13, further comprising adding an identifier of the application to a collection of applications in response to a determination that the scaled rule results do not satisfy the threshold but that the application is selected for deployment in the production environment, wherein: each respective application of the collection of applications produced a respective rule result that fails at least one rule of the validation rules; and re-training the neural network comprises re-training the neural network based on the collection of applications.

15. The method of any embodiment of embodiments 1 to 14, the method further comprising obtaining a context value indicating that a data migration event or a resource outage occurred concurrently with the execution of the application in the first environment, wherein providing the machine learning model with the metrics comprises providing the machine learning model with the context value.

16. The method of any embodiment of embodiments 1 to 15, wherein modifying the rule results with the rule-related weights comprises: determining a first product by multiplying a first weight of the rule-related weights with a first quantitative result of the rule results; determining a second product by multiplying a second weight of the rule-related weights with a second quantitative result of the rule results; and determining a sum based on the first product and the second product, wherein determining whether the modified rule results fail an allowance threshold comprises determining whether the sum satisfies the allowance threshold.

17. The method of any embodiment of embodiments 1 to 16, the method further comprising: executing an additional application in the first environment to generate a metric of the additional application, wherein a first validation rule of the validation rules is satisfied by the metric of the additional application; and in response to a determination that the first validation rule is satisfied by the metric of the additional application, scheduling the additional application for deployment in the second environment without using the machine learning model.

18. The method of any embodiment of embodiments 1 to 17, the method further comprising: executing a second application in the first environment to generate a second rule result that indicates that a first validation rule of the validation rules is satisfied by the second rule result; and in response to a determination that the first validation rule is satisfied by the second rule result, scheduling the second application for deployment in the second environment without using the machine learning model.

19. The method of any embodiment of embodiments 1 to 18, the method further comprising scheduling the second application for deployment to the second environment.

20. The method of any embodiment of embodiments 1 to 19, wherein a metric of the second application satisfies a first rule, the method further comprising: determining whether the deployment of the second application to the second environment is scheduled for a time that satisfies a minimum duration; and in response to a determination that the minimum duration is not satisfied, scheduling the second application in the second environment for a later deployment time without changing a deployment time of the second application.

21. The method of any embodiment of embodiments 1 to 20, wherein the application is a first application, the method further comprising: obtaining a new rule in the first environment; generating new rule results that indicate a rule satisfaction state of each application of set of applications in the first environment for the new rule; determining that a metric of a second application in the first environment fails the new rule, wherein a version of the second application used to generate the metric of the second application is deployed in the second environment; determining a new weight associated with the new rule by providing the machine learning model with the new rule results; updating the threshold based on the new rule; and modifying the new rule results based on the new weight, wherein the modified new rule results satisfy the threshold.

22. The method of any embodiment of embodiments 1 to 21, the method further comprising deploying the first application from the first environment to the second environment.

23. One or more tangible, non-transitory, machine-readable media storing instructions that, when executed by one or more processors, effectuation operations comprising those of any of embodiments 1-22.

24. A system comprising: one or more processors; and memory storing computer program instructions that, when executed by the one or more processors, cause the one or more processors to effectuate operations comprising those of any of embodiments 1-22.

What is claimed is:

1. A method for training a prediction model for application deployment to a production environment by modifying rule-related weights associated with a rule set comprising:
   providing a neural network with metrics obtained from an execution of an application in a test environment to determine rule-related weights for validation rules;
   scaling rule results with the rule-related weights to determine scaled rule results, wherein the rule results indicate which rules of the validation rules are satisfied or failed by the metrics;
   in response to a determination that the scaled rule results fails a threshold but that the application is selected for deployment in a production environment, re-training the neural network with the rule results of the application, an indication that the executed application is selected for deployment in the production environment, and rule results of other applications in the test environment that are not selected for deployment in the production environment;
   providing the re-trained neural network with the rule results to generate updated rule-related weights; and
   scaling the rule results by the updated rule-related weights to determine updated scaled rule results, wherein the updated scaled rule results satisfy the threshold.

2. The method of claim 1, wherein the rule results are first rule results, further comprising:
   obtaining a weight deviation threshold;
   executing a second application in the test environment to generate a second database-related metric and second rule results indicating a same failed rule as the first rule results; and providing the neural network with the second rule results to determine second rule-related weights, wherein a difference between a first weight of the updated rule-related weights and a second weight of the second rule-related weights is less than the weight deviation threshold.

3. The method of claim 1, wherein the neural network is a first neural network, the method further comprising:
providing a second neural network with the metrics to determine a decision score, whether the application should be deployed in the production environment, wherein providing the first neural network with the metrics comprises:
determining whether the decision score satisfies a threshold indicating that the application should be deployed; and
in response to a determination that the decision score satisfies the threshold indicating that the application should be deployed and that the rule results indicates that a rule of the validation rules has been failed, providing the first neural network with the metrics.

4. The method of claim 1, further comprising adding an identifier of the application to a collection of applications in response to a determination that the scaled rule results do not satisfy the threshold but that the application is selected for deployment in the production environment, wherein:
each respective application of the collection of applications produced a respective rule result that fails at least one rule of the validation rules; and
re-training the neural network comprises re-training the neural network based on the collection of applications.

5. A system comprising:
one or more processors executing computer program instructions that, when executed, cause operations comprising:
providing a machine learning model with metrics obtained from an execution of an application in a first environment to determine rule-related weights for validation rules;
modifying rule results with the rule-related weights, wherein the rule results indicating which rules of the validation rules are satisfied or failed by the metrics;
determining whether the modified rule results satisfies a threshold;
in response to a determination that the modified rule results does not satisfy the threshold but that the application is selected for deployment in a second environment, storing the rule results and an indicator that the application is selected for deployment in the second environment in a collection of results;
re-training the machine learning model based on the collection of results and rule results of other applications in the first environment that are not selected for deployment in the second environment;
providing the re-trained machine learning model with the rule results to generate updated rule-related weights; and
updating the rule results based on the updated rule-related weights to determine updated modified rule results, wherein the updated modified rule results satisfies the threshold.

6. The system of claim 5, the operations further comprising obtaining a context value indicating that a data migration event or a resource outage occurred concurrently with the execution of the application in the first environment, wherein providing the machine learning model with the metrics comprises providing the machine learning model with the context value.

7. The system of claim 5, wherein modifying the rule results with the rule-related weights comprises:
determining a first product by multiplying a first weight of the rule-related weights with a first quantitative result of the rule results;
determining a second product by multiplying a second weight of the rule-related weights with a second quantitative result of the rule results; and
determining a sum based on the first product and the second product, wherein determining whether the modified rule results fail an allowance threshold comprises determining whether the sum satisfies the allowance threshold.

8. The system of claim 5, the operations further comprising:
executing an additional application in the first environment to generate a metric of the additional application, wherein a first validation rule of the validation rules is satisfied by the metric of the additional application; and
in response to a determination that the first validation rule is satisfied by the metric of the additional application, scheduling the additional application for deployment in the second environment without using the machine learning model.

9. The system of claim 5, the operations further comprising:
executing a second application in the first environment to generate a second rule result that indicates that a first validation rule of the validation rules is satisfied by the second rule result; and
in response to a determination that the first validation rule is satisfied by the second rule result, scheduling the second application for deployment in the second environment without using the machine learning model.

10. The system of claim 9, the operations further comprising scheduling the second application for deployment to the second environment.

11. The system of claim 9, wherein a metric of the second application satisfies a first rule, the operations further comprising:
determining whether the deployment of the second application to the second environment is scheduled for a time that satisfies a minimum duration; and
in response to a determination that the minimum duration is not satisfied, scheduling the second application in the second environment for a later deployment time without changing a deployment time of the second application.

12. The system of claim 5, wherein the application is a first application, the operations further comprising:
obtaining a new rule in the first environment;
generating new rule results that indicate a rule satisfaction state of each application of set of applications in the first environment for the new rule;
determining that a metric of a second application in the first environment fails the new rule, wherein a version of the second application used to generate the metric of the second application is deployed in the second environment;
determining a new weight associated with the new rule by providing the machine learning model with the new rule results;
updating the threshold based on the new rule; and modifying the new rule results based on the new weight, wherein the modified new rule results satisfy the threshold.

13. The system of claim 5, the operations further comprising deploying the first application from the first environment to the second environment.

14. A non-transitory computer-readable media storing instructions that, when executed by one or more processor, cause operations comprising:
  providing a prediction model with a set of values obtained from an execution of an application in a first environment to determine a set of weights for a rule set;
  modifying a set of rule results with a set of weights, the set of rule results indicating which rules of the rule set are satisfied by the set of values;
  determining whether the modified rule results satisfies a set of criteria;
  in response to a determination that the modified rule result does not satisfy the set of criteria but that the application is selected for deployment in a second environment, storing the rule results and an indicator that the application is selected for deployment in the second environment in a collection of results;
  updating parameters of the prediction model based on the collection of results;
  providing the prediction model with the rule result to generate an updated set of weights after updating the parameters of the prediction model based on the collection of results; and
  updating the rule result based on the updated set of weights to determine an updated modified rule result, wherein the updated modified rule result satisfies the set of criteria.

15. The media of claim 14, wherein the application is a first application, the operations further comprising:
  generating a plurality of vectors, wherein each respective vector of the plurality of vectors is associated with respective set of values of a respective application, and wherein the plurality of vectors comprises a first vector based on values of the first application;
  filtering the plurality of vectors to a subset of vectors, wherein each application associated with a vector of the subset of vectors is indicated to have been deployed in the second environment;
  determining an n-dimensional boundary in a dimension space of the plurality of vectors based on the subset of vectors, wherein n is an integer greater than three, wherein determining whether the modified rule results satisfies the set of criteria comprises determining whether the first vector is within the n-dimensional boundary.

16. The media of claim 15, the operations further comprising:
  obtaining a second vector based on outputs of a version of a second application;
  receiving a message indicating that the version of the second application has been deployed in the second environment;
  determining whether the second vector is within the n-dimensional boundary; and
  based on a determination that the second vector is not within the n-dimensional boundary, updating the n-dimensional boundary based on the second vector.

17. The media of claim 14 wherein the application is a first application, the operations further comprising:
  identifying a second application modified by a rollback event in the second environment;
  determining whether the second application failed a rule of the rule set in the first environment; and
  based on a determination that the second application failed the rule of the rule set, increasing a weight associated with the rule, wherein the set of weights comprises the weight.

18. The media of claim 14, the operations further comprising:
  determining whether a weight associated with a first rule of the rule set is less than a weight threshold; and
  presenting an alert that the weight associated with the first rule is less than the weight threshold.

19. The media of claim 14, wherein the set of rule results is a first set of rule results, the operations further comprising:
  determining that a second application should be deployed to the second environment based on a second set of rule results of the second application by:
    determining a second set of weights the prediction model;
    modifying the second set of rule results with the second set of weights to determine a modified second set of rule results;
    determining that the modified second set of rule results satisfies the set of criteria;
  scheduling the deployment of the second application based on a determination that the second application should be deployed to the second environment
  determining whether the deployment of the second application to the second environment is scheduled for a time that satisfies a minimum duration;
  in response to a determination that the minimum duration is not satisfied, scheduling the second application in the second environment for a later deployment time.

20. The media of claim 14, wherein the set of values of the application comprise an amount of memory consumed, an amount of processor resources consumed, or an amount of network resources consumed.

* * * * *